United States Patent
Hrncar et al.

(10) Patent No.: US 8,924,181 B2
(45) Date of Patent: Dec. 30, 2014

(54) OPERATING REFRIGERATION SYSTEMS

(75) Inventors: Martin Hrncar, Prague (CZ); Radek Fisera, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 463 days.

(21) Appl. No.: 13/247,591

(22) Filed: Sep. 28, 2011

(65) Prior Publication Data

US 2013/0080115 A1    Mar. 28, 2013

(51) Int. Cl.
*G06F 17/18* (2006.01)
*G06F 15/00* (2006.01)
*G06N 5/02* (2006.01)
*G05B 19/042* (2006.01)

(52) U.S. Cl.
CPC ............ *G06F 15/00* (2013.01); *G05B 19/0428* (2013.01); *G05B 2219/24074* (2013.01); *G06N 5/02* (2013.01); *G05B 2219/2654* (2013.01)
USPC ................ 702/181; 62/127; 62/129; 62/11.1; 700/276; 236/94

(58) Field of Classification Search
CPC .. F25B 49/02; F25B 2600/05; F25B 2600/02; F25B 2700/151; F25B 2700/195; F25B 2700/197; F25B 2700/2116; F25B 2700/2117; F25B 2700/21172; F25B 2700/21173; F25B 2400/22; F25B 2700/21175; F25B 7/00; F25B 2400/75; F25B 2400/075; F25B 5/00; F25B 2700/21163; F25D 2700/14; F25D 11/022; G06F 15/00; G05B 19/0428; G05B 2219/2654; G05B 2219/24084; G06N 5/02
USPC ........... 702/181; 700/276; 62/127, 129, 11.1; 236/94
See application file for complete search history.

(56) References Cited

U.S. PATENT DOCUMENTS

| | | | | |
|---|---|---|---|---|
| 6,467,300 | B1 * | 10/2002 | Noble, III | 62/472 |
| 6,668,240 | B2 * | 12/2003 | Singh et al. | 702/188 |
| 6,675,591 | B2 * | 1/2004 | Singh et al. | 62/129 |
| 6,892,546 | B2 * | 5/2005 | Singh et al. | 62/127 |
| 7,024,870 | B2 * | 4/2006 | Singh et al. | 62/126 |
| 7,599,759 | B2 * | 10/2009 | Zugibe et al. | 700/275 |
| 7,644,591 | B2 * | 1/2010 | Singh et al. | 62/127 |
| 8,065,886 | B2 * | 11/2011 | Singh et al. | 62/127 |
| 2002/0139136 | A1 * | 10/2002 | Noble, III | 62/473 |
| 2002/0189267 | A1 * | 12/2002 | Singh et al. | 62/126 |
| 2002/0193970 | A1 * | 12/2002 | Singh et al. | 702/188 |
| 2003/0005710 | A1 * | 1/2003 | Singh et al. | 62/129 |
| 2004/0060305 | A1 * | 4/2004 | Singh et al. | 62/126 |
| 2005/0028539 | A1 * | 2/2005 | Singh et al. | 62/127 |
| 2007/0256432 | A1 * | 11/2007 | Zugibe et al. | 62/115 |
| 2010/0010681 | A1 * | 1/2010 | Zugibe et al. | 700/282 |
| 2010/0179703 | A1 * | 7/2010 | Singh et al. | 700/291 |
| 2010/0293397 | A1 * | 11/2010 | Pham et al. | 713/300 |
| 2013/0269376 | A1 * | 10/2013 | Zugibe et al. | 62/115 |

\* cited by examiner

*Primary Examiner* — Carol S Tsai
(74) *Attorney, Agent, or Firm* — Brooks, Cameron & Huebsch, PLLC

(57) ABSTRACT

Operating refrigeration systems is described herein. One method includes receiving operating information associated with a refrigeration system, and determining a probability of liquid slugging occurring in the refrigeration system before liquid slugging occurs in the refrigeration system based, at least in part, on the operating information.

18 Claims, 2 Drawing Sheets

OPERATING REFRIGERATION SYSTEMS

TECHNICAL FIELD

The present disclosure relates to operating refrigeration systems.

BACKGROUND

Liquid slugging can occur in a refrigeration system (e.g., a commercial refrigeration system) when liquid refrigerant enters a compressor (e.g., a compressor rack) of the system. Liquid slugging can have a number of detrimental effects on a refrigeration system because, for example, liquid is not compressible in a compressor. For example, liquid slugging can decrease compressor performance and/or decrease a service life of a compressor.

Further, liquid slugging can physically damage a compressor. For example, liquid slugging can cause rods in the compressor to break and/or can damage winding insulation of the compressor. Liquid slugging can be especially detrimental to reciprocating compressors because, for example, these types of compressors may be especially sensitive to liquid entry.

The presence of liquid slugging in a refrigeration system can be detected based on, for example, auditory feedback (e.g., a particular noise) emanating from a compressor. However, in such situations, damage to the compressor has already been done by liquid slugging.

Alternatively, liquid slugging can be detected by monitoring refrigerant vapor entering a compressor for the presence of liquid particles. However, such monitoring may use additional instrumentation and/or may lack early warning capability.

Some previous approaches attempt to prevent liquid slugging by overdesigning one or more metrics of the refrigeration system (e.g., by increasing superheat). Overdesign of system metrics may, however, decrease the efficiency and/or increase the cost of the refrigeration system.

DETAILED DESCRIPTION

Operating refrigeration systems is described herein. For example, embodiments include receiving operating information associated with a refrigeration system, and determining a probability of liquid slugging occurring in the refrigeration system before liquid slugging occurs in the refrigeration system based, at least in part, on the operating information.

Embodiments of the present disclosure can determine and/or predictively detect (e.g., detect and/or predict) liquid slugging before the liquid slugging occurs and can thereby reduce costs associated with liquid slugging damage. For example, embodiments of the present disclosure can reduce costs associated with reduced compressor life and/or replacement of compressor components.

Additionally, embodiments of the present disclosure can predictively detect liquid slugging without the need for additional instrumentation (e.g., instrumentation additional to that of an operational refrigeration system).

Further, embodiments of the present disclosure can provide a notification if liquid slugging is predictively detected to occur. For example, embodiments of the present disclosure can notify an operator (e.g., a user) that liquid slugging has been predictively detected.

Additionally, embodiments of the present disclosure can prevent liquid slugging without overdesigning one or more refrigeration system metrics, which can increase the efficiency and/or decrease the cost of a refrigeration system as compared to previous approaches.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of rules" can refer to one or more rules.

Figure 1:
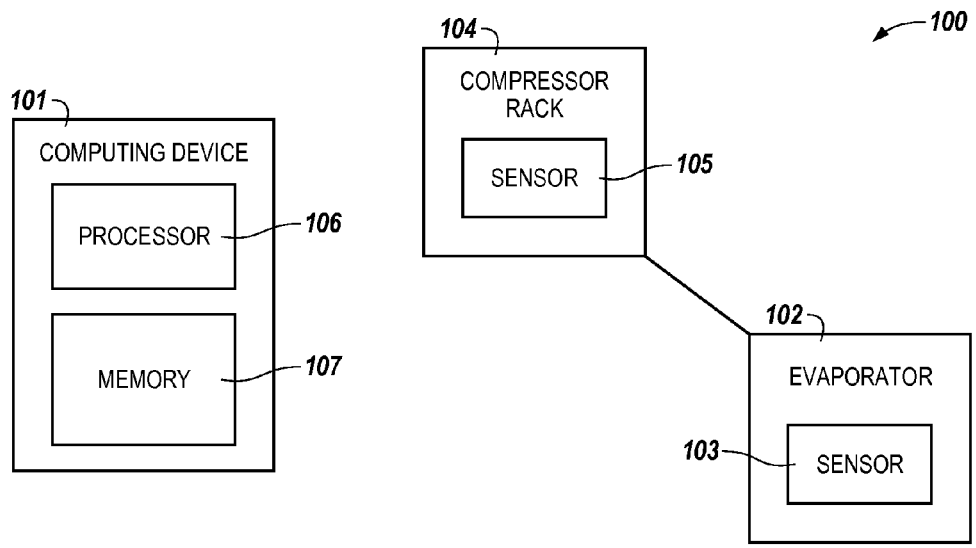
FIG. 1 illustrates a refrigeration system in accordance with one or more embodiments of the present disclosure.

FIG. 1 illustrates a refrigeration system 100 in accordance with one or more embodiments of the present disclosure. Refrigeration system 100 can be, for example, a commercial refrigeration system. However, embodiments of the present disclosure are not limited to a particular type of refrigeration system.

As shown in FIG. 1, system 100 includes an evaporator 102 and a compressor rack 104. As will be appreciated by those of ordinary skill in the art, a refrigeration system (e.g., system 100) can include a number of additional components not illustrated in FIG. 1.

As shown in FIG. 1, a sensor 103 can be associated with evaporator 102, and a sensor 105 can be associated with compressor rack 104. Although two sensors are illustrated in FIG. 1, system 100 can include any number of sensors.

Although sensors 103 and 105 are included within evaporator 102 and compressor rack 104 in the embodiment illustrated in FIG. 1, embodiments of the present disclosure are not so limited. For example, in some embodiments, the sensors can be coupled to, separate from, and/or adjacent to the compressor rack and/or evaporator.

Sensor 103 can sense (e.g., acquire, detect, and/or measure) data (e.g., operating information) associated with evaporator 102 (e.g., while evaporator 102 is operating). Sensor 103 can be and/or include a sensor configured to sense a single type of data (e.g., temperature data) and/or multiple types of data (e.g., temperature data and pressure data).

A physical location of sensor 103 with respect to evaporator 102 is not limited by embodiments of the present disclosure. For example, sensor 103 can be located inside a housing of evaporator 102, a particular distance from evaporator 102, and/or at other locations.

Additionally and/or alternatively, sensor 103 can include any number of data acquisition portions configured to acquire sensor data. For example, sensor 103 can include a portion configured to sense temperature data associated with evaporator 102, a portion configured to sense pressure data associated with an electronic expansion valve (EEV) associated with evaporator 102 (not illustrated in FIG. 1), a portion configured to sense pressure data associated with an electric evaporator pressure regulating (EEPR) valve (not illustrated in FIG. 1), and/or combinations of these components and/or others.

Sensor 105 can sense data associated with compressor rack 104 (e.g., while compressor rack 104 is operating) in a manner analogous to that previously discussed in connection with sensor 103. For example, sensor 105 can sense data associated with compressor rack 104, a housing associated with compressor rack 104 (e.g., compressor rack house), an inlet associated with compressor rack 104 (not illustrated in FIG. 1), and/or combinations of these components and/or others.

As illustrated in FIG. 1, system 100 can include a computing device 101. Although not shown in FIG. 1, computing device 101 can be communicatively coupled to sensor 103 and/or 105. A communicative coupling can include wired and/or wireless connections and/or networks such that data can be transferred in any direction between sensor 103, sensor 105, and/or computing device 101. Although one computing device is shown, embodiments of the present disclosure are not limited to a particular number of computing devices.

Computing device 101 includes a processor 106 and a memory 107. As shown in FIG. 1, memory 107 can be coupled to processor 106. Memory 107 can be volatile or nonvolatile memory. Memory 107 can also be removable (e.g., portable) memory, or non-removable (e.g., internal) memory. For example, memory 107 can be random access memory (RAM) (e.g., dynamic random access memory (DRAM), and/or phase change random access memory (PCRAM)), read-only memory (ROM) (e.g., electrically erasable programmable read-only memory (EEPROM), and/or compact-disk read-only memory (CD-ROM)), flash memory, a laser disk, a digital versatile disk (DVD), and/or other optical disk storage), and/or a magnetic medium such as magnetic cassettes, tapes, or disks, among other types of memory.

Further, although memory 107 is illustrated as being located in computing device 101, embodiments of the present disclosure are not so limited. For example, memory 107 can also be located internal to another computing resource, e.g., enabling computer readable instructions to be downloaded over the Internet or another wired or wireless connection.

Memory 107 can store executable instructions, such as, for example, computer readable instructions (e.g., software), for determining and/or predictively detecting liquid slugging in a refrigeration system (e.g., system 100) in accordance with one or more embodiments of the present disclosure. For example, memory 107 can store executable instructions for determining a probability (e.g., an estimated likelihood) of liquid slugging occurring in system 100 before liquid slugging occurs in system 100 based, at least in part, on operating information received from sensor 103 and/or sensor 105. Additionally, memory 107 can store, for example, the determined probability of liquid slugging, among other data items.

Processor 106 can execute the executable instructions stored in memory 107 to determine and/or predictively detect liquid slugging in accordance with one or more embodiments of the present disclosure. For example, processor 106 can execute the executable instructions stored in memory 107 to determine a probability of liquid slugging occurring in system 100 before liquid slugging occurs in system 100 based, at least in part, on operating information received from sensor 103 and/or sensor 105.

Figure 2:
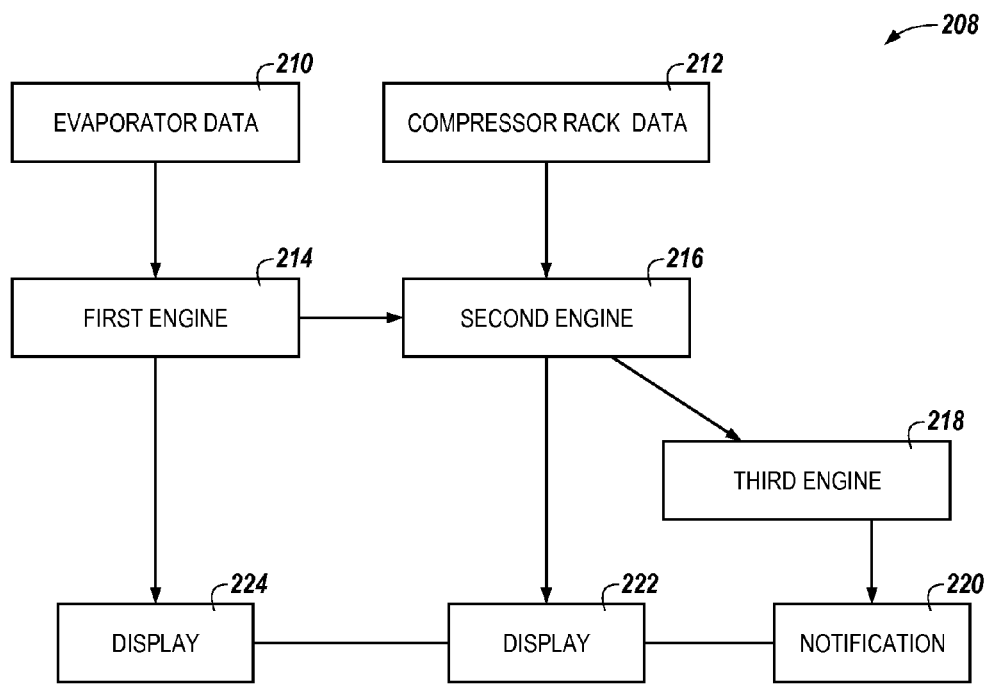
FIG. 2 illustrates a flow chart associated with operating a refrigeration system in accordance with one or more embodiments of the present disclosure.

FIG. 2 illustrates a flow chart 208 associated with operating a refrigeration system (e.g., refrigeration system 100 previously discussed in connection with FIG. 1) in accordance with one or more embodiments of the present disclosure. For example, flow chart 208 can be used (e.g., by a number of computing devices previously discussed in connection with FIG. 1) to determine and/or predictively detect liquid slugging in a refrigeration system in accordance with one or more embodiments of the present disclosure.

As shown in FIG. 2, flow chart 208 includes evaporator data 210. Evaporator data 210 can, for example, be received (e.g., received by a computing device) from sensor 103 associated with evaporator 102 previously discussed in connection with FIG. 1. Evaporator data 210 can include, for example, a temperature and/or a superheat (e.g., a difference between a set superheat temperature and a sensed superheat temperature of a refrigerant in an evaporator) of an evaporator (e.g., evaporator 102 previously discussed in connection with FIG. 1), a temperature of air discharged from an evaporator, and/or an evaporating temperature (e.g., a temperature of a phase change) of a refrigerant in an evaporator, among other data.

Flow chart 208 includes compressor rack data 212. Compressor rack data 212 can, for example, be received from sensor 105 associated with compressor rack 104 previously discussed in connection with FIG. 1. Compressor rack data 212 can include, for example, a suction temperature associated with an inlet of a compressor rack (e.g., compressor rack 104 previously discussed in connection with FIG. 1), a suction pressure associated with an inlet of a compressor rack, and/or a temperature of a housing associated with a compressor rack (e.g., a rack house), among other data.

Operating information (e.g., evaporator data 210 and/or compressor rack data 212) can additionally include information and/or data determined from sensory data (e.g., data determined based on further processing of data sensed by sensors 103 and/or 105 previously discussed in connection with FIG. 1). For example, a suction superheat temperature can be determined based on a suction temperature and a suction pressure associated with a compressor rack inlet. Additionally, a refrigerant condensing temperature can be determined based on a suction pressure associated with a compressor rack.

As shown in FIG. 2, evaporator data 210 can be received by a first engine 214. Although not illustrated in FIG. 2, evaporator data 210 can be, for example, preprocessed before reaching first engine 214. For example, mathematical outliers can be removed from evaporator data 210.

First engine 214 can use evaporator data 210 to determine (e.g., detect and/or identify) a number of indicators associated with liquid slugging based on a set and/or number of adjustable rules, discussed below. Indicators associated with liquid slugging can be deviations from normal operating behavior of a system (e.g., deviations sensed by sensors 103 and/or 105).

For example, first engine 214 can determine that a superheat is reduced (e.g., reduced from a normal operating superheat). A number of rules and/or definitions can be set and/or modified (e.g., by a user) regarding a particular difference in the two temperatures that can yield indicators and/or faults associated with a reduced superheat.

Additionally and/or alternatively, first engine 214 can determine and/or detect that a coil of an evaporator is and/or may be iced over. An iced evaporator coil can decrease operating capability of a refrigeration system by, for example, decreasing an effectiveness of heat exchange resulting in low superheat (e.g., superheat below superheat set point). An example rule used to determine a presence of ice on an evaporator coil can include, for example, an increase in a difference between an evaporating temperature of a refrigerant in a refrigeration system and air discharged from the system.

Additionally and/or alternatively, first engine 214 can determine that an EEV of an evaporator is stuck open (e.g., malfunctioning) and/or oversized. A stuck-open and/or oversized EEV can result in liquid slugging by, for example, reducing superheat such that a greater amount of refrigerant passing through a coil of an evaporator is vaporized slowly (e.g., slower than normal operation). An example rule used to determine a stuck-open and/or oversized EEV can include, for example, a decrease in a difference between an evaporating temperature of a refrigerant in a refrigeration system and air discharged from the system due to, for example, a decrease in the temperature of discharged air.

As previously discussed, first engine 214 can determine a number of faults based on evaporator data 210. Faults can be, for example, abnormal conditions and/or defects that can lead to a failure of system 100 (e.g., a failure caused by liquid slugging). Faults can be determined by a single indicator and/or a combination of multiple indicators. For example, first engine 214 can determine and/or predictively detect liquid slugging and/or a probability of liquid slugging occurring in refrigeration system 100.

Determining and/or predictively detecting a probability of liquid slugging occurring in refrigeration system 100 can, for example, include determining a numeric probability (e.g., a percentage) that liquid slugging is occurring. However, embodiments of the present disclosure are not so limited. Rather, determining and/or predictively detecting a probability can include, for example, determining a likelihood of liquid slugging occurring and/or an estimate of a probability of liquid slugging occurring.

Determining faults and/or indicators associated with liquid slugging can include, for example, determining a severity (e.g., level, strength and/or weight) of operating information (e.g., data) indicating liquid slugging. For example, a superheat 10 degrees Fahrenheit below a superheat set point can indicate a higher probability of liquid slugging than a superheat 2 degrees Fahrenheit below the superheat set point.

Additionally, first engine 214 can aggregate the faults determined from evaporator data 210. For example, first engine 214 can store determined faults and determine a number of faults occurring (e.g., a frequency of fault(s) and/or cumulative number of faults) over a particular period of time. Aggregated faults can be used to determine liquid slugging because, for example, an increased rate and/or number of fault(s) can indicate an increased probability of liquid slugging. Further, aggregated faults can be communicated to and/or received by display 224, discussed below.

Once determined by first engine 214, faults and/or indicators (e.g., unaggregated faults and/or indicators) associated with liquid slugging based on evaporator data 210 can be communicated to and/or received by second engine 216. For example, second engine 216 can receive a determination from first engine 214 associated with an indicator (e.g., near-zero superheat) and/or a determination of a fault (e.g., detected liquid slugging associated with an evaporator).

As shown in FIG. 2, second engine 216 can receive compressor rack data 212 in a manner analogous to first engine 214 receiving evaporator data 210, as previously discussed. Additionally and/or alternatively, second engine 216 can receive the determined faults and/or indicators determined by first engine 214 from first engine 214.

Second engine 216 can use compressor rack data 212 and/or the faults and/or indicators received from first engine 214 to determine a number of faults and/or indicators. Faults and/or indicators determined by second engine 216 can, for example, include faults and/or indicators determined by first engine 214, though embodiments of the present disclosure do not limit the faults determined by second engine 216 to particular faults. Rather, second engine 216 can determine any number and/or type of faults with respect to liquid slugging in a refrigeration system (e.g., system 100).

Second engine 216 can determine indicators such as, for example, liquid condensation and/or liquid slugging. Additionally and/or alternatively, second engine 216 can determine a number of faults such as, for example, liquid floodback and/or liquid condensation.

For example, second engine 216 can determine liquid floodback associated with an inlet of a compressor rack based on suction superheat and a temperature of an evaporator (e.g., sensed by sensor 103 previously discussed in connection with FIG. 1). An example rule (e.g., combination of rules) used to determine liquid floodback can include, for example, a temperature of an evaporator being below a particular temperature (e.g., 2 degrees Fahrenheit) and, at the same time (e.g., substantially the same time), suction superheat being below a particular temperature (e.g., 30 degrees Fahrenheit).

Additionally and/or alternatively, second engine 216 can determine a presence of liquid condensation inside a compressor rack based on, for example, a difference between a temperature of a compressor rack house and an expected condensing temperature of a refrigerant. The expected condensing temperature of the refrigerant can be determined using a suction pressure associated with the compressor rack. An example rule used to determine liquid condensation inside the compressor rack can include, for example, a decrease in the difference between the compressor rack house temperature and the expected condensing temperature. For example, if the compressor rack house temperature becomes less than 10 degrees Fahrenheit greater than the expected condensing temperature, second engine 216 can determine a fault and/or indicator associated with liquid condensation inside the compressor rack.

Once determined by second engine 216, faults and/or indicators associated with liquid slugging based on evaporator data 210 and/or compressor rack data 212 can be communicated to and/or received by third engine 218. Additionally and/or alternatively, determined faults can be aggregated and communicated to and/or received by display 222, discussed below, in a manner analogous to that previously discussed in connection with first engine 214.

As shown in FIG. 2, third engine 218 can receive determined faults and/or indicators from second engine 216. Third engine 218 can use the received determined faults and/or indicators to determine additional faults and/or indicators. For example, third engine 218 can determine a probability of liquid slugging occurring in a refrigeration system. In a manner analogous to that previously discussed to first engine 214 and second engine 216, third engine 218 can aggregate a number of determined faults and provide a notification 220 associated with the aggregated faults, discussed further below.

Additionally and/or alternatively, third engine 218 can use aggregated faults to determine a probability of liquid slugging occurring in a refrigeration system. Additionally, third engine 218 can determine whether a determined probability of liquid slugging occurring in a refrigeration system meets or exceeds a particular probability (e.g., a threshold probability).

A determined probability that meets or exceeds a particular probability can be displayed via notification 220. Upon receiving notification 220, an operator of system 100 can, for example, take corrective action to alleviate and/or prevent liquid slugging. Further, notification 220 can include a recommendation associated with a number of corrective actions. For example, notification 220 can inform an operator of a refrigeration system that a particular probability of liquid slugging in the system has been exceeded, and/or can recommend that the operator temporarily shut down the system to avoid liquid slugging. Embodiments of the present disclosure do not limit notification 220 to a display. Rather, notification 220 can include any type of notification including, for example, an audio notification.

As previously discussed, display 224 can receive a number of aggregated faults determined by first engine 214 based on evaporator data 210. In an analogous manner, display 222 can receive a number of aggregated faults determined by second engine 216 based on evaporator data 210, compressor rack data 212, indicators determined by first engine 214, faults determined by first engine 214, and/or combinations thereof.

Accordingly, display 224 can display the aggregated faults determined by first engine 214. For example, display 224 can display aggregated faults associated with ice on one or more coils of an evaporator. Continuing in the example, display 224 can display aggregated faults associated with an EEV stuck open and/or liquid slugging associated with the evaporator, previously discussed.

Display 222 can display the aggregated faults determined by second engine 216. For example, display 222 can display aggregated faults associated with liquid condensation and/or liquid floodback, as previously discussed.

As illustrated in FIG. 2, a user who may have received notification 220 can use display 222 and/or display 224 to determine (e.g., drill down) one or more causes of the liquid slugging. For example, notification 220, display 222 and/or display 224 can display a hierarchy of potential causes of the determined liquid slugging. A hierarchy can include, for example, aggregated faults associated with a refrigeration system as a whole (e.g., a determination and/or predictive detection of liquid slugging in the system) and/or can include aggregated faults associated with components of the system (e.g., a determination of an iced evaporator coil), among others.

In a manner analogous to that previously discussed in connection with notification 220, display 222 and/or display 224 can provide a recommendation associated with correcting the liquid slugging (e.g., a recommended corrective action). For example, an operator of a refrigeration system can receive notification 220 indicating that there is a high probability of liquid slugging in the system. Continuing in the example, the operator can use display 222 and/or display 224 to determine a location (e.g., one or more locations) within the system causing the liquid slugging. For example, the operator can visualize, via display 224, that a number of faults have been aggregated associated with a determination by first engine 214 that an EEV of an evaporator is stuck open. Further, display 224 can include a recommendation that the malfunctioning EEV needs repair or replacement to cure the liquid slugging.

Figure 3:
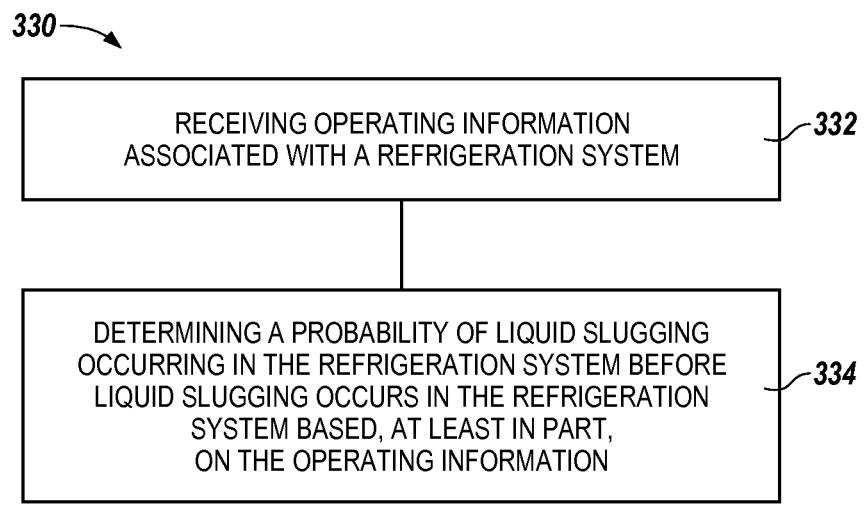
FIG. 3 illustrates a method for operating a refrigeration system in accordance with one or more embodiments of the present disclosure.

FIG. 3 illustrates a method 330 for operating a refrigeration system (e.g., system 100 described in connection with FIG. 1) in accordance with one or more embodiments of the present disclosure. Method 330 can be performed, for example, by one or more computing devices previously discussed in connection with FIGS. 1 and/or 2. Method 330 can be used, for example, to determine and/or predictively detect liquid slugging in the refrigeration system.

At block 332, method 330 includes receiving operating information associated with a refrigeration system. Receiving operating information can include, for example receiving evaporator data and/or compressor rack data in a manner analogous to that previously discussed in FIG. 2.

At block 334, method 330 includes determining a probability of liquid slugging occurring in the refrigeration system before liquid slugging occurs in the refrigeration system based, at least in part, on the operating information. A probability of liquid slugging occurring in the refrigeration system can be determined, for example, in a manner analogous to that previously discussed in connection with FIG. 2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of operating a refrigeration system, comprising:
   receiving operating information associated with a refrigeration system, wherein at least a portion of the operating information is received from a sensor associated with an inlet of a compressor rack of the refrigeration system;
   determining a respective probability of liquid slugging caused by each of a plurality of components of the refrigeration system before liquid slugging occurs in the refrigeration system based, at least in part, on the operating information; and
   providing a notification responsive to at least one determined probability of the plurality of probabilities meeting or exceeding a particular threshold probability, wherein the notification includes a display of a hierarchy of the plurality of components according to the respective probability of liquid slugging caused by each of the plurality of components.

2. The method of claim 1, wherein the operating information is received from a number of sensors associated with the refrigeration system while the refrigeration system is operating.

3. The method of claim 1, wherein at least a portion of the operating information is received from a sensor associated with a compressor rack of the refrigeration system.

4. The method of claim 1, wherein at least a portion of the operating information is received from a sensor associated with an electronic expansion valve of the refrigeration system.

5. The method of claim 1, wherein the method includes aggregating the operating information.

6. The method of claim 1, wherein the method includes determining whether the probability of liquid slugging occurring in the refrigeration system meets or exceeds a particular probability.

7. The method of claim 1, wherein the method includes displaying the determined probability of liquid slugging occurring in the refrigeration system.

8. The method of claim 1, wherein the method includes providing a notification if the determined probability of liquid slugging occurring in the refrigeration system meets or exceeds a particular probability.

9. The method of claim 1, wherein the method includes recommending a corrective action if the determined probability of liquid slugging occurring in the refrigeration system meets or exceeds a particular probability, wherein the corrective action is based, at least in part, on the operating information.

10. A system for operating a refrigeration system, comprising:
a first sensor associated with an inlet of a compressor rack of a refrigeration system;
a second sensor associated with an evaporator of the refrigeration system; and
a computing device configured to:
receive operating information associated with the compressor rack and/or evaporator from the first and/or second sensors while the refrigeration system is operating;
determine a number of faults based, at least in part, on the operating information;
detect liquid slugging associated with the refrigeration system based, at least in part, on the determined number of faults and/or the operating information;
determine a respective probability of liquid slugging caused by each of a plurality of components of the refrigeration system based, at least in part, on the determined number of faults and/or the operating information; and
provide a notification responsive to at least one determined probability of the plurality of probabilities meeting or exceeding a particular threshold probability, wherein the notification includes a display of a hierarchy of the plurality of components according to the respective probability of liquid slugging caused by each of the plurality of components.

11. The system of claim 10, wherein the operating information associated with the evaporator includes an evaporating temperature of a refrigerant in the evaporator.

12. The system of claim 10, wherein the operating information associated with the evaporator includes a temperature of discharged air from the evaporator.

13. The system of claim 10, wherein the operating information associated with the compressor rack includes a suction temperature associated with the compressor rack.

14. The system of claim 10, wherein the operating information associated with the compressor rack includes a suction pressure associated with the compressor rack.

15. The system of claim 10, wherein the operating information includes a suction superheat associated with the compressor subsystem.

16. A computing device for operating a refrigeration system, comprising:
a memory; and
a processor coupled to the memory;
wherein the processor is configured to execute executable instructions stored in the memory to:
receive evaporator data and compressor rack data associated with a refrigeration system, wherein the compressor rack data includes data determined by a sensor associated with an inlet of a compressor rack;
determine a number of aggregated faults based, at least in part, on the evaporator data and the compressor rack data;
determine a respective probability of liquid slugging caused by each of a plurality of components of the refrigeration system based, at least in part, on the aggregated faults; and
provide a notification responsive to at least one determined probability of the plurality of probabilities meeting or exceeding a particular threshold probability, wherein the notification includes a display of a hierarchy of the plurality of components according to the respective probability of liquid slugging caused by each of the plurality of components.

17. The computing device of claim 16, wherein the aggregated faults and the determined probability are determined based on a set of adjustable rules.

18. The computing device of claim 16, wherein the processor is configured to execute executable instructions stored in the memory to determine a severity of each of the number of aggregated faults.

* * * * *